March 6, 1951 L. L. PFAHLER 2,544,178
FROG FISH LURE
Filed Dec. 11, 1947

INVENTOR.
Lloyd L. Pfahler
BY Frank H. Slough &
J. H. Slough, Attys.

Patented Mar. 6, 1951

2,544,178

UNITED STATES PATENT OFFICE 2,544,178

FROG FISH LURE

Lloyd L. Pfahler, Mansfield, Ohio

Application December 11, 1947, Serial No. 791,114

2 Claims. (Cl. 43—42.3)

My invention relates to fish lures and relates more particularly to lures resembling an amphibious animal such as a frog.

More specifically the main object of my invention is to provide a fish lure of the type referred to which is a surface lure in which the legs are close to the body when the lure is in motion and which legs will have an action resembling that of a frog due to the movement of the lure through the water and the particular construction of the legs and the attachment to the body.

Another object of my invention is to provide an improved lure of the type referred to which will have an action attractive to fish, simple in construction, and highly effective in use.

Other objectives of my invention and the invention itself will become more readily apparent if reference is had to the accompanying drawing in which.

Figure 1:
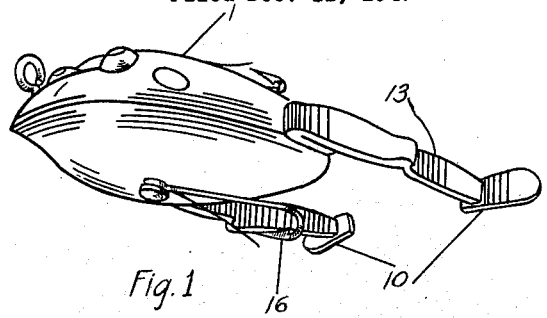
Fig. 1 is a perspective view of the improved lure of my invention.

Referring now to the drawings, in all of which like parts are designated by like reference characters, in the improved lure of my invention, 1 designates the main body of a frog. The forward end portion 2 or, as referred to, the nose portion, is tapered downwardly as shown on 3 on the upper surface of the lure and has a substantially curved undersurface 4. Protuberances 5 simulating eyes are either formed integrally with the main body portion or else are secured thereto by pin means or the like. The main body portion 1 of the lure is preferably constructed of wood or other suitable material, which tends to float in water. To the lead or forward portion of the lure an eye screw 7 is secured whereby the lure may be secured to a fish line for use.

Figure 5:
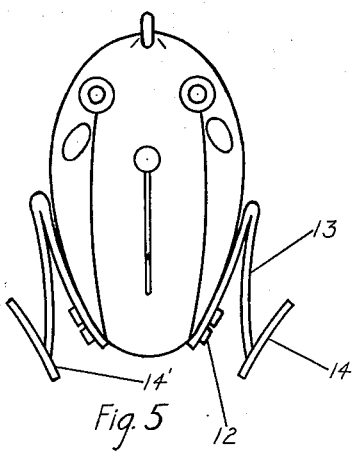
Fig. 5 is a top plan view of the lure of my invention, showing the legs in a different operative position than that of Fig. 4.

At the rear portion of the body 1, which is formed with the inwardly converging tapered sides 9, are a pair of legs 10, said legs being secured to the body portion by pin or like means 12. These legs are formed of flat resilient rubber strips or bands 12 and 14. A depending hook 16 is suitably secured to the underside of the body portion by means of an eye screw 17 secured into said body. The legs as shown consist of three portions, the thigh portion 13, the leg portion 13, and the foot portion 14. It will be noted that the leg is folded back substantially at its medial portion to form a thigh 13' and leg 13 as illustrated in Figs. 2 and 5, when the lure is in its inoperative original position and that, as the lure is drawn through the water, the leg portion 13" of the legs is moved outwardly and generally laterally from its original position pulling the thigh portion 13' in substantially the same direction, the foot portion being in a position disposed rearwardly and outwardly from the leg portion.

Figure 2:
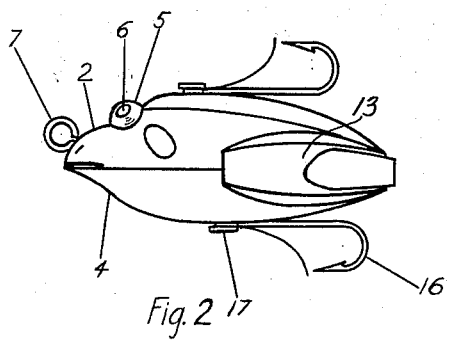
Fig. 2 is a side plan view of the lure of my invention.
Figure 3:
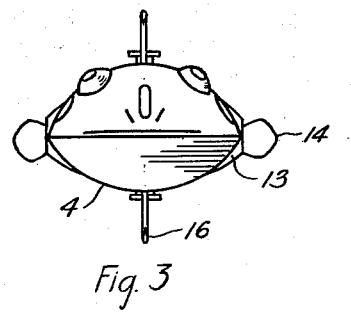
Fig. 3 is a front plan view of the lure of Fig. 1.
Figure 4:
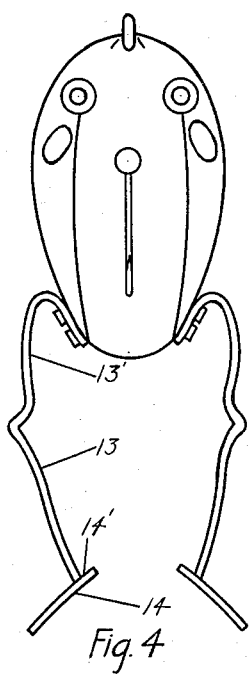
Fig. 4 is a top plan view of the lure of my invention, showing the lure in the position of Fig. 1.

Thus, when the bait is lying motionless or substantially so in the water as illustrated in Figs. 2, 3 and 4 the legs are folded up, lying in a position forward and close to the main body portion. If the line to which the portion is attached is given a forward pull the main body portion will be required, of course, to move forwardly under the influence of and at a distance corresponding to the extent of such a pull; the thigh, then, will move outwardly from the body and the legs will be thrust rearwardly thereof, the heels 14' of the foot portions 14, 14 being brought closer together and the feet extending downwardly therefrom. The force of the water on the feet 14 causes the leg portions 13 and thigh portions 13[1] to start their rearward movement. Upon the relinquishment of the forward pull, however, the legs will, by virtue of their construction, be restored to their former original position. The action of the water or intermittent or constant pull of the lure with its resultant effect upon the thighs, legs, and foot portions when the lure is in forward movement forces the legs outwardly and rearwardly from the lure and the lure achieves a kicking or swimming movement of the lure.

The lure thus described may be made of wood or light material as above set forth or may be constructed of hard rubber, plastic, or the like. It is preferred, however, that the bait almost float and that the legs be formed of rubber or like material, wherefore the above described outward and rearward action of the legs giving the frog a likelike appearance in the water will be achieved and the natural effect of the bait and the luring qualities with respect to game sought are thus attained.

It may be appreciated that although I have described my lure in connection with a preferred embodiment of the same, that numerous and extensive departures may be made therefrom without, however, departing from the spirit or substance of the invention and the scope of the appended claims.

I claim:

1. An artificial fish bait or lure formed to simulate a frog or the like comprising in combination, a main generally ovate body portion, a pair of legs, said legs being formed of substantially flat rubber or like resilient material, the legs each consisting of a thigh portion rigidly secured at one end to a rearward portion of the main body portion of the lure and in lapped relation to the main body portion when in its initial position, a leg portion integrally formed with the thigh portion and disposed in lapped relation therewith when the leg is in its initial position, and a foot portion secured to the free end of said leg portion and in generally lapped relation therewith when the leg is in its initial position, movement of the lure through water causing said lapped portion of each of said legs to move rearwardly of each other and of the lure body, said foot members being disposed in a forwardly and outwardly extending position when in the initial position thereof and in a rearwardly and outwardly extending position when in the extended position thereof.

2. An artificial fish bait or lure formed to simulate a frog or the like comprising in combination, a main solid body portion formed to simulate the body portion of a frog being generally ovate in form and formed of a material having a slightly greater density than water so as to almost float upon water, a pair of legs, said legs being formed of substantially flat rubber or like resilient material, the legs each consisting of a thigh portion rigidly secured at one end to a rearward portion of the main body portion of the lure and in lapped relation to the main body portion when in its initial position, a leg portion integrally formed with the thigh portion and disposed in lapped relation therewith when the leg is in its initial position, and a foot portion secured to the free end of said leg portion and in generally lapped relation therewith when the leg is in its initial position, movement of the lure through water causing said lapped portion of each of said legs to move rearwardly of each other and of the lure body, said foot members being disposed in a forwardly and outwardly extending position when in the initial position thereof and in a rearwardly and outwardly extending position when in the extended position thereof.

LLOYD L. PFAHLER.

REFERENCES CITED

The following references are of record in the file of this patent:

UNITED STATES PATENTS

| Number | Name | Date |
|---|---|---|
| 536,512 | Crossley | Mar. 26, 1895 |
| 1,604,027 | Dills | Oct. 19, 1926 |
| 1,888,221 | Coffin | Nov. 22, 1932 |
| 1,986,991 | Wilson | Jan. 8, 1935 |
| 2,209,161 | Gunderson | July 23, 1940 |